United States Patent [19]

Levin et al.

[11] Patent Number: 4,620,227
[45] Date of Patent: Oct. 28, 1986

[54] DATA DECODER

[75] Inventors: Michael M. Levin, Agoura Hills; Jerry A. Boshear, Simi Valley, both of Calif.

[73] Assignee: Cybernetic Data Products, Chatsworth, Calif.

[21] Appl. No.: 575,030

[22] Filed: Jan. 30, 1984

[51] Int. Cl.$^4$ .................... H04N 7/093; H04N 7/08
[52] U.S. Cl. .................................... 358/147; 358/142
[58] Field of Search ............... 358/141, 142, 143, 144, 358/145, 146, 147, 160, 171, 172

[56] References Cited

U.S. PATENT DOCUMENTS 3,900,887  8/1975  Soga et al. ...................... 358/142
4,380,027  4/1983  Leventer et al. ................ 358/147

Primary Examiner—James J. Groody
Assistant Examiner—Michael D. Parker
Attorney, Agent, or Firm—James & Franklin

[57] ABSTRACT

The decoder is capable of locating a data signal within any horizontal line of a video signal, thereby eliminating the necessity for keeping track of the line numbers. The pre-data portion is detected and the data portion is stored in the same register. DC level restoration of the video signal is performed periodically during digitizing. When the decoder is used to receive a data signal in the standard FCC waveform, the clock run in portion, normally used for synchronization in conventional decoders, is detected and the operating rate of the register is adjusted to the rate of the data portion for a number of clock signals equal to the number of data bits to capture the data portion. Once the data has been captured, further signals are prevented from entering the register for approximately one frame to permit the stored data to be retrieved.

37 Claims, 7 Drawing Figures

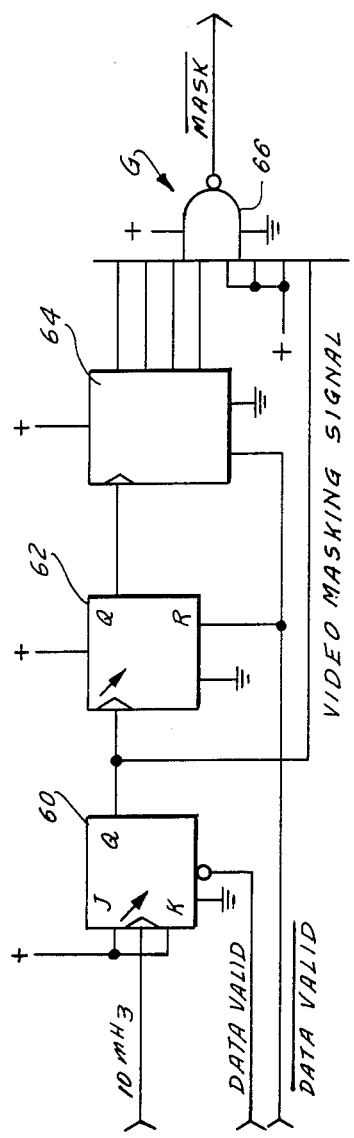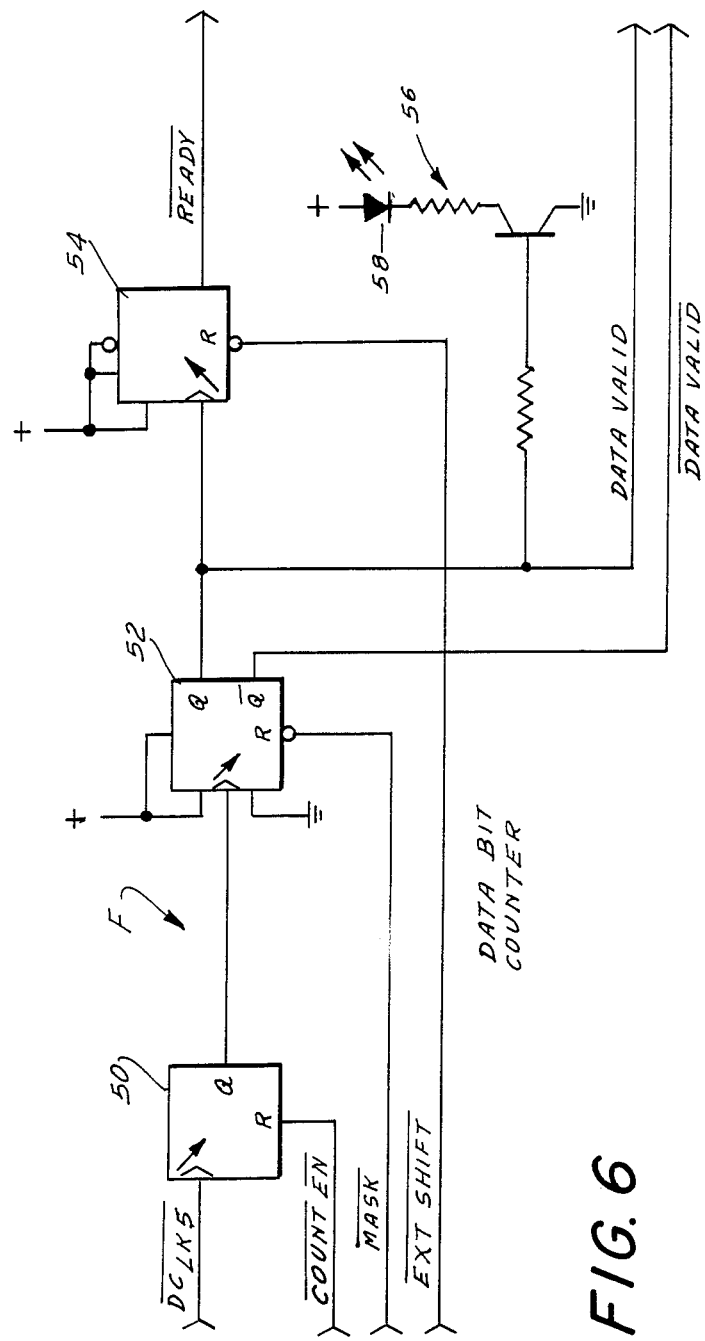
FIG. 7
FIG. 6

DATA DECODER

The present invention relates to a data decoder and, more particularly, to a decoder designed to capture data from a video signal, regardless of the horizontal line in which the data is located and which is capable of obtaining data from a composite data signal conforming to the FCC Television Synchronizing Waveform For Color Transmission.

A video signal intended for display by a conventional cathode ray tube (CRT) contains information to enable the electron beam to scan the tube horizontally, line by line, for each frame to develop a picture. At the end of each frame, the beam is repositioned at the start of the first horizontal line for the next frame. Accordingly, the video signal can be considered to comprise a number of segments, each segment containing the information necessary to display a single horizontal line on the cathode ray tube.

Each of the horizontal line segments of the video signal includes a part which contains information normally intended to be processed and displayed to form the picture. In addition, each of the horizontal line segments also contains a part which is processed, but not intended to be directly displayed to form the picture, such as color burst information, blanking level information, horizontal synchronizing signals, and a section which normally contains no signal.

Modern video transmitters contain extremely complex, expensive, and high powered equipment. In order to utilize such equipment more fully, broadcasters include data signals within the section of the horizontal line segments of the video signal which normally contains no signal. The information in this data signal can be utilized in conjunction with the picture portion of the program or separately, as desired. For example, text information for closed captioning of programs for the hearing impaired is broadcast in this manner. Television sets with the necessary decoding equipment extract the data signals and process them to provide captions which are displayed on the screen along with the television program material. The data signals contain encoded information which provides the instructions for the display formatting and the alpha-numerical characters for the captions.

In other instances, only the information from the data signal is used and the remainder of the video signal is discarded. For example, the information from the data signal may be utilized to provide text for an electronic billboard or to display financial information in the form of an electronic tickertape, or in any other instance in which alpha-numeric characters or the like are to be transmitted and displayed.

By using existing video transmitters to broadcast information in this manner, the information can be broadcast without substantial additional cost Thus, incorporating the data signal within the broadcast video signal is a very cost effective way to disseminate the information.

The Federal Communications Commission has developed a protocol which defines the manner in which the information must be broadcast. This protocol is known as the Standard Television Synchronizing Waveform For Color Transmission, and it is set forth in sub-part E, part 73 of the FCC Rules and Regulations. According to this protocol, the information is contained in a composite data signal located within the active video portion of the twenty-first horizontal line of each frame. The composite video signal includes a clock run in (data synchronizing) portion, a "dwell" portion, a "start" portion, and a data portion. The instantaneous data rate is 32 times the horizontal line scanning frequency. The average data transmission rate is about 360 bits per second.

Since the data rate is locked to the horizontal scanning frequency, the horizontal synchronizing pulses could be used to provide frequency synchronization for the decoder data clock. However, because variations in video to horizontal synch pulse timing may occur in processing amplifiers, horizontal synch pulse timing is normally not relied on for data clock phase control. Instead, the clock run in or data synchronizing portion of the composite data signal is used to set the timing for a data clock located in the decoder.

According to the FCC protocol, the clock run-in portion consists of a "data burst" which is frequency and phase locked to the caption data signal. It is this portion of the signal which provides synchronizing information for the internal decoder data clock. The clock run-in portion is followed by the interval during which the signal is at blanking level. At the end of this interval, a start cycle is transmitted.

More specifically, the clock run in portion consists of four sinewave cycles, each having a period of two microseconds. This is followed by an interval of four microseconds at the blanking level (logic 0) which, in turn, is followed by a two microsecond (start) signal at logic "1". The "start" signal is then followed by sixteen bits of data, each two microseconds in duration.

In a conventional decoder, counters are utilized to count the horizontal lines. When line 21 is reached, the decoder is frequency and phase locked through the use of the clock run in portion of the signal. When the "start" bit is received, the decoder will store the data portion of the composite data signal. Accordingly, conventional decoders are designed to receive a composite data signal which appears on horizontal line 21 only, and cannot be used to retrieve data which appears on any other horizontal line of the video signal.

The present invention, however, operates on a different principle. It can detect and receive data signals which are situated on any horizontal line of the video signal. In general, this is accomplished by eliminating the horizontal line counting and monitoring each horizontal line of the video signal. When the data signal is located, the data is captured and stored. If the data signal is broadcast in the FCC protocol, the pre-data portion thereof, including the clock run in portion, the blanking portion, and the "start" portion is detected as a preamble and the data portion is captured.

In order to detect this pre-data portion, the decoder of the present invention normally operates at a rate which is twice the frequency of the clock run-in portion, such that two bits of information are obtained from each sinewave cycle. Operating in this manner enables the decoder to accurately recognize the pre-data portion of the composite data signal. However, in order to actually capture the data portion of the signal, it is necessary to reduce the operating rate of the decoder to match the data rate of the data portion. Accordingly, after detecting the pre-data portion, the present invention will automatically adjust the operating speed of the capture circuit to store the data portion of the composite data signal.

The speed shift feature of the present invention is employed to permit the decoder to accurately capture data from a signal which is broadcast in the standard FCC protocol. This feature is required because of the particular nature of this composite data signal, and, more precisely, because of the rate of the clock run-in portion and the rate of the data. When the composite video signal is digitized, each full cycle of the clock run-in portion corresponds to two bits, such that the clock run-in portion is received at a rate which is twice the rate of the data portion. Accordingly, if the pre-data portion is to be recognized, the decoder must operate at twice the data rate to do so. However, once the pre-data portion is detected, the decoder must shift to a lower rate to capture the data.

For composite data signals in which the pre-data portion is broadcast at the same rate as the data, the speed shifting feature is not required. However, it is this speed shifting feature which permits the decoder of the present invention to be usable with composite data signals broadcast in the standard FCC protocol. This is important because the transmitters are designed to transmit composite data signals according to this protocol. Considerable expense would be required to alter the design of the transmitters to broadcast a data signal having a different waveform.

Thus, one novel aspect of the present invention is that it can utilize the portion of the standard composite data signal normally used for frequency and phase locking in a conventional decoder as a preamble which can be detected wherever it appears. Accordingly, the decoder of the present invention can be used to receive composite data signals broadcast in the standard protocol and is also versatile enough to capture composite data signals which appear at different locations in the video signal or which have different formats (but with recognizable pre-data portions), with only slight modification.

Another feature of the present invention is that it employs a simplified circuit to digitize the received video signal which periodically stabilizes the video signal at the proper black level. This circuit eliminates the necessity for complex sample and hold circuitry, normally employed in conventional decoders.

It is, therefore, a prime object of the present invention to provide a data decoder which can capture data appearing on any of the horizontal lines of a video signal.

It is another object of the present invention to provide a data decoder which can be used to capture data from a composite data signal broadcast in the standard FCC protocol.

It is another object of the present invention to provide a data decoder capable of recognizing the pre-data portion of a composite data signal broadcast in the standard FCC format and, thereafter, capturing the data portion of the signal.

It is another object of the present invention to provide a data decoder which automatically shifts the operating rate of the capture circuit to store the data portion of the composite data signal.

It is another object of the present invention to provide a data decoder which includes a simplified means of stabilizing the video signal at the black level during the digitizing thereof.

It is another object of the present invention to provide a data decoder in which the black level of the video signal is stabilized once during each horizontal line.

It is another object of the present invention to provide a data decoder which utilizes the same shift register means in order to detect the pre-data portion of the composite data signal as well as to capture the data portion thereof.

It is another object of the present invention to provide a data decoder which employs simplified circuitry such that it can be manufactured at a reduced cost as compared to conventional data decoders of this type.

It is another object of the present invention to provide a data decoder which employs standard parts which function together reliably to provide a long, useful life.

In accordance with one aspect of the present invention, apparatus is provided for decoding data from a video signal of the type including a series of horizontal line segments, one of which includes a data signal in a normally unused part thereof. The apparatus comprises means for digitizing the video signal to form a series of digitized line signals. Means are provided for receiving each of the digitized line signals, in sequence. Means are provided for detecting the presence of a data signal in any one of the digitized line signals within the receiving means. Means are provided for controlling the receiving means to store the data signal in response to the detection thereof. Means are provided for transferring the stored data signal from the receiving means.

Each of the horizontal line segments comprises a line synchronization signal. The apparatus further comprises means for detecting each of the line synchronization signals and for generating a timing signal in response thereto.

The digitizing means comprises means for stabilizing the video signal in response to each of the timing signals. Thus, the video signal is stabilized once during each horizontal line segment of the video signal. The digital means includes DC restoration means and slicing means. The slicing means includes a first comparator means operatively connected to receive the video signal. The DC restoration means is operatively connected to the first comparator means to adjust the reference level thereof in response to each of the timing signals. A slicing level signal source is operatively connected to the first comparator means.

The DC restoration means comprises second comparator means. A black level clamping level source is operatively connected to the second comparator means. Gating means, effective when actuated, operably connects the output of the second comparator means to the first comparator means. The gating means is actuated by each of the timing signals. The gating means is also effective, when actuated, to connect the output of the second comparator means with an input of the second comparator means, in feedback relation.

The receiving means is actuated upon the detection of the beginning of each of the digitized line signals. The receiving means is deactuated in response to each of the timing signals.

The receiving means comprises shift register means operably connected to receive the digitized line signals. Means for clocking the shift register means are also provided. The detecting means includes gating means operably connected to the shift register means for detecting the data signal and for generating a detection signal in response thereto.

The data signal includes a given number of data bits. The controlling means comprises counter means operably connected to the clocking means for counting the number of bits of the data signal in the shift register means, in response to the detection signal. The counting means is effective to terminate the clocking means after the given number of bits have been counted.

Means are provided for preventing digitized line signals from being received in the shift register means for a preselected interval after termination of the clocking means. In this manner, only the data portion of the composite data signal is stored in the shift register means and further portions of the digitized line signals are prevented from entering the shift register for a preselected time.

The data signal includes a pre-data portion and a data portion. The clocking means includes means for operating the shift register means at the data rate of the pre-data portion of the composite data signal until the detection signal is generated. Thereafter, the shift register means is operated at the data rate of the data portion.

The clocking means includes an oscillator and means, effective when actuated, to operably connect the output signal from the oscillator to the shift register means. The connecting means is actuated by the beginning of each digitized line signal and deactuated by the end thereof.

The connecting means includes means for adjusting the rate of the output signal from the oscillator to correspond with the data rate of the data portion, in response to the detection signal. Thus, for composite data signals with a pre-data portion, which is at a different rate than the data portion, the operating rate of the shift register can be adjusted to cause the shift register to receive the data portion. This permits the decoder of the present invention to receive composite data signals broadcase in the standard FCC protocol.

In accordance with another aspect of the present invention, apparatus is provided for decoding data from a video signal of the type consisting of a series of horizontal line segments, one of which includes a data signal in a section not normally used, where the data signal comprises a data synchronizing portion at a first data rate, and a data portion at a second data rate. The apparatus includes means for digitizing the video signal to form a series of digitized line signals. Means are provided for receiving each of the digitized line signals, in sequence. The receiving means normally operates at the first data rate. Means are provided for detecting the presence of the data synchronizing portion within the receiving means. Means are provided which are effective, upon detection of the data synchronizing portion, to control the receiving means to store the data portion. The controlling means comprises means for operating the receiving means at the second data rate. Means are provided for terminating the operation of the receiving means after the data portion is received therein. Means are also provided for transferring the stored data from the receiving means.

The receiving means includes shift register means operably connected to receive the digitized line signals. Means are provided for clocking the shift register means. The detecting means includes gating means associated with the shift register means for detecting the data synchronizing portion in the shift register means and for generating a detection signal in response thereto.

Means, operably connected to the clocking means, are provided for counting the number of bits of the data portion in the shift register means, in response to the generation of the detection signal and, thereafter, to deactuate the clocking means when all of the bits in the data portion have been received in the shift register means. Means are provided for preventing digitized line signals from being received in the shift register means for a preselected time interval after all of the bits in the data portion have been received in the shift register means. In this manner, only the data portion of the digitized line signal is retained in the shift register means.

The clocking means includes means for operating the shift register means at the first data rate until the detection signal is generated and, thereafter, at the second data rate. The clocking means includes an oscillator and means effective, when actuated, to operably connect the output signal from the oscillator to the shift register means. The connecting means is actuated by the beginning of each digitized line signal and deactuated by the end thereof. The connecting means includes means for adjusting the rate of the output signal of the oscillator to the second data rate.

In accordance with another aspect of the present invention, apparatus is provided for digitizing a video signal of the type adapted to be displayed on a CRT or the like. The apparatus comprises DC level restoration means and slicing means.

The slicing means comprises first comparator means having first and second inputs. The first input is operably connected to receive the video signal. The DC level restoration means is operably connected to the first comparator means to periodically adjust the reference level thereof.

The video signal includes a plurality of line synchronization signals. The DC level restoration means is actuated in response to each of the line synchronization signals.

The slicing means includes a slicing level signal source operably connected to the second input of the first comparator means. The DC level restoration means includes a second comparator means having first and second inputs. A black level clamping signal source is operably connected to the first input of the second comparator means. Gating means, effective when actuated, operably connect the output of the second comparator means to the first input of the first comparator means. The gating means is actuated in response to each of the line synchronizing signals. The gating means is effective, when actuated, to operably connect the output of the second comparator means with the second input of the second comparator means.

To these and to such other objects which may hereinafter appear, the present invention relates to a data decoder as described in detail in the following specification, and recited in the annexed claims, taken together with the accompanying drawings, wherein like numerals refer to like parts, and in which:

FIG. 6 is a schematic diagram of the data bit counter of the present invention; and FIG. 7 is a schematic diagram of the video mask circuit of the present invention.

Figure 1:
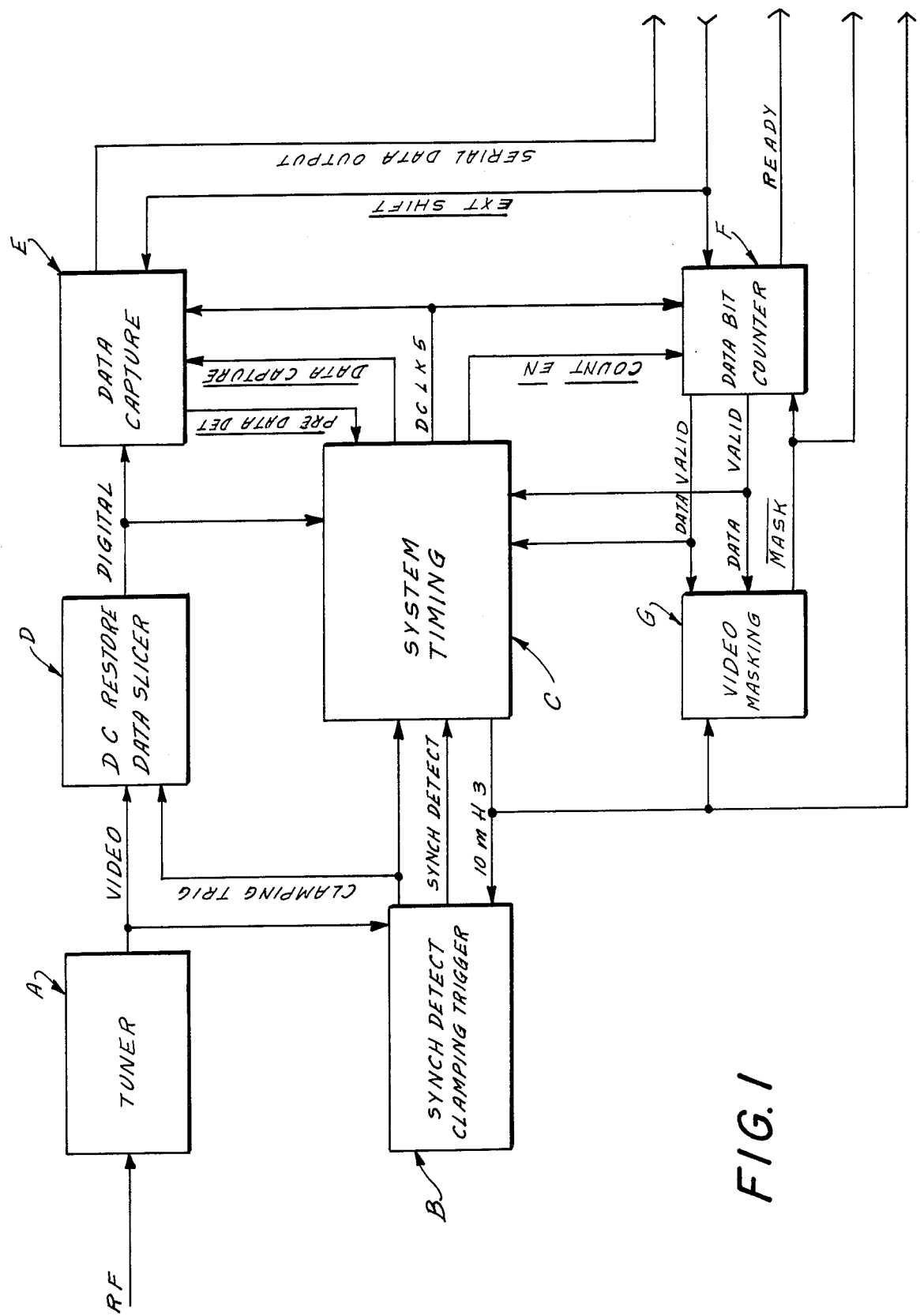
FIG. 1 is a block diagram of the decoder of the present invention.

An overview of the operation of the decoder of the present invention can best be obtained with reference to FIG. 1. The decoder is described as it would be designed to receive a composite data signal in the standard FCC protocol. However, it is to be understood that slight modifications to the circuit can be made to received data signals in other formats. Such modifications are well within the ability of those skilled in the art.

A conventional antenna (not shown) provides the RF input into the tuner circuit, generally designated A. Tuner circuit A includes the circuitry necessary to take a broadcast signal from the antenna input, perform all required automatic fine tuning and automatic gain control operations, as well as channel selection, noise suppression, and trapping out of audio carriers so as to provide a relatively uniform video output. Any conventional tuning circuit can be used for this purpose and the particular configuration of the tuner circuit employed in the present invention plays no part therein. A conventional varactor tuner, coupled with a video IF circuit, the output of which passes through an audio trap or filter, can be employed for this purpose and many different circuits of this type are well known in the art.

The output of circuit A is unclamped, but relatively stable. The video output of circuit A is fed into a synch detect and clamping trigger generator circuit, generally designated B. Circuit B generates two outputs, a synch detect output and a clamping trigger output. The synch detect output is fed to the system timing circuit, generally designated C, for the purpose of resetting the system timing circuit to rearm it at the end of each horizontal line signal which did not result in the capture of data. The clamping trigger signal is also fed to system timing circuit C and serves a similar purpose. In addition, the clamping trigger signal is fed to the DC restore/data slicer circuit, generally designated D.

The DC restore/data slicer circuit D receives the video output from tuner circuit A and in conjunction with the clamping trigger signal, generates a digitized (sliced) data output and internally stabilizes the video signal at the black level. The clamping trigger signal provides a reference point at the video black level for circuit D to perform its DC restoration function.

The digitized output from circuit D is fed to the data capture circuit, generally designated E, and to the system timing circuit C. Data capture circuit E also receives a data capture synchronization signal and a clocking signal (DCLK5) from the system timing circuit C. Data capture circuit E, upon detection of the pre-data portion of the composite data signal, generates a pre-data detect signal to system timing circuit C, indicating that a valid pre-data portion has been received. Upon receipt of the pre-data detection signal, the rate of the clocking signal (DCLK5), generated from system timing circuit C, will be changed such that the operation of the data capture circuit E will downshift to half the data rate in order to actually acquire the data portion of the composite data signal: Once the data capture circuit E has stored all of the bits of the data portion of the composite data signal, the operation thereof will cease for a predetermined period, during which the acquired data may be accessed by a microprocessor (not shown) by generating an external shift signal.

Upon generation of the pre-data detect signal from the data capture circuit E, indicating that a valid pre-data portion has been obtained, system timing circuit C will generate a count enable signal. The count enable signal is generated to a data bit counter circuit, generally designated F. Data bit counter circuit F, which also receives the clocking pulses (DCLK5), counts the pulses until the count equals the number of bits in the data portion of the composite data signal. Once the count equals the number of bits in the data portion of the composite data signal, a data valid signal is generated. The data valid output is converted into a ready signal and transferred to the microprocessor to notify the microprocessor that the data is ready to be received from data capture circuit E.

The data valid signal and its complement are fed to system timing circuit C and to a video masking circuit, generally designated G. Video masking circuit G functions to keep the system from false triggering on video information which may contain a pattern similar to the pre-data pattern of the composite data signal. It does this by generating a mask signal which causes the data bit counter circuit F to send the complement of the data valid signal to the system timing circuit C so as to prevent the system timing circuit C from operating the data capture circuit E for a predetermined interval.

Once the data portion of the composite data signal has been acquired, video masking circuit G prevents data capture circuit E from recognizing any system signals until just before the horizontal line containing the composite data signal of the next frame. In the event that the circuit on power "up" is locked in erroneously on some invalid data, at the end of that full frame of masking, the system will start searching for a valid pre-data portion again, in which case it will eventually get back to the horizontal line in which the composite data signal is present. In actual practice, this occurs typically on the first frame of the video.

System timing circuit C contains all of the necessary circuitry to operate all of the circuits in the system. It also incorporates an oscillator circuit which acts as the master reference clock for the entire decoder system. This master reference clock generates a 10 mHz timing signal which is fed to synch detect/clamping trigger circuit B, video mask circuit G, and to the microprocessor.

Figure 2:
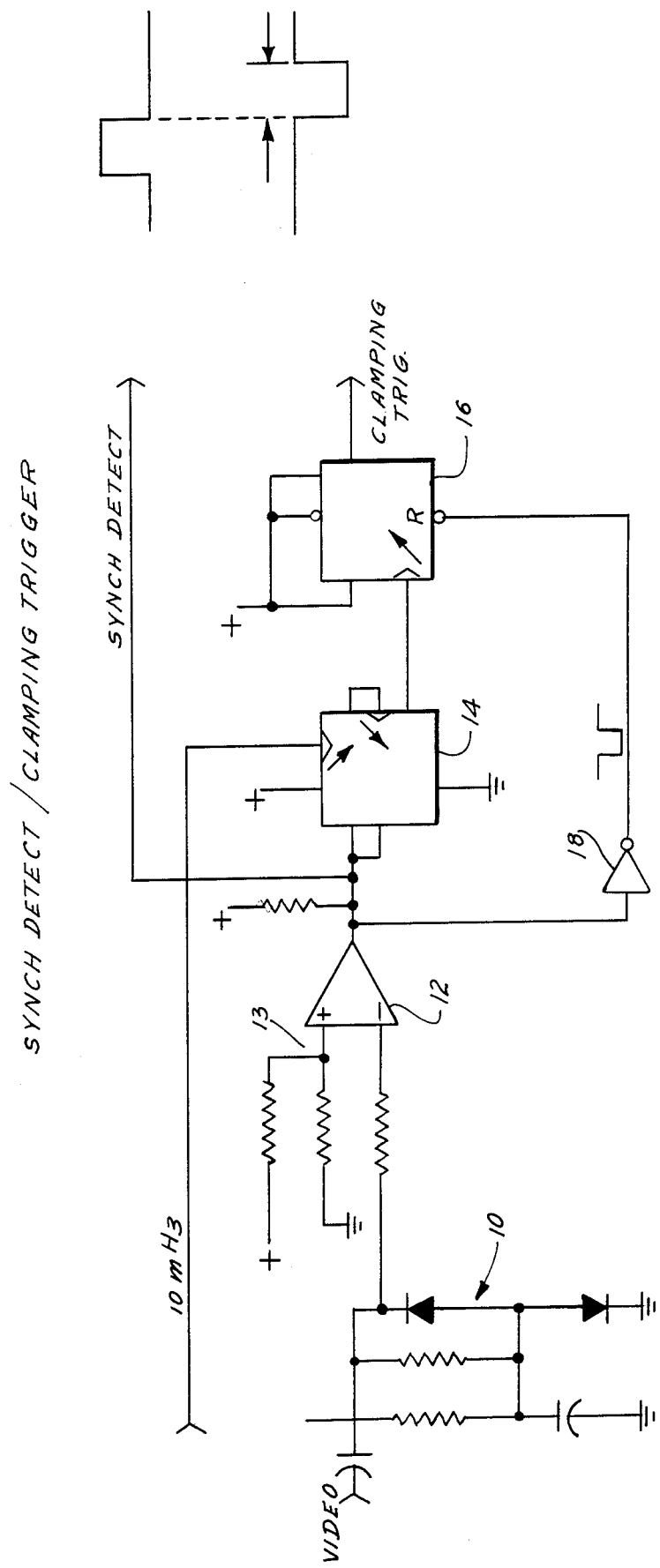
FIG. 2 is a schematic diagram of the synch detect/clamping trigger circuit of the present invention.

As shown in FIG. 2, the synch detect/clamping trigger circuit takes the unclamped video output from tuner A and the 10 mHz clocking signal from system timing circuit C and generates two output signals. The first signal (synch detect) is a non-clock phase positive going synchronizing signal which coincides with the horizontal line synch signals present in the video signal. The second signal (clamping trigger) is a signal which normally is positive, but goes negative in conjunction with the falling edge of the synch detect output and remains at this low state for 3.2 microseconds. The purpose of the clamping trigger signal is to provide a positive edge immediately after colorburst on the video signal in order to allow for a black level reference restoration, as described below.

The video signal received in circuit B passes through a filter 10 to the negative input of comparator 12. The positive input of comparator 12 is fed from a +12 volt source through a voltage divider 13. The output of comparator 12, which is tied to a +5 volt source through a resistor, is the synch detect signal. This output is fed to the input of a first flip-flop circuit 14, which also receives the 10 mHz clocking signal. The output of flip-flop 14 is connected to the input of a second flip-flop 16, the reset input of which is connected to receive the output of comparator 12 through an inverting amplifier 18. This portion of the circuit serves to invert and delay the synch detect pulse to generate the clamping trigger output.

Figure 3:
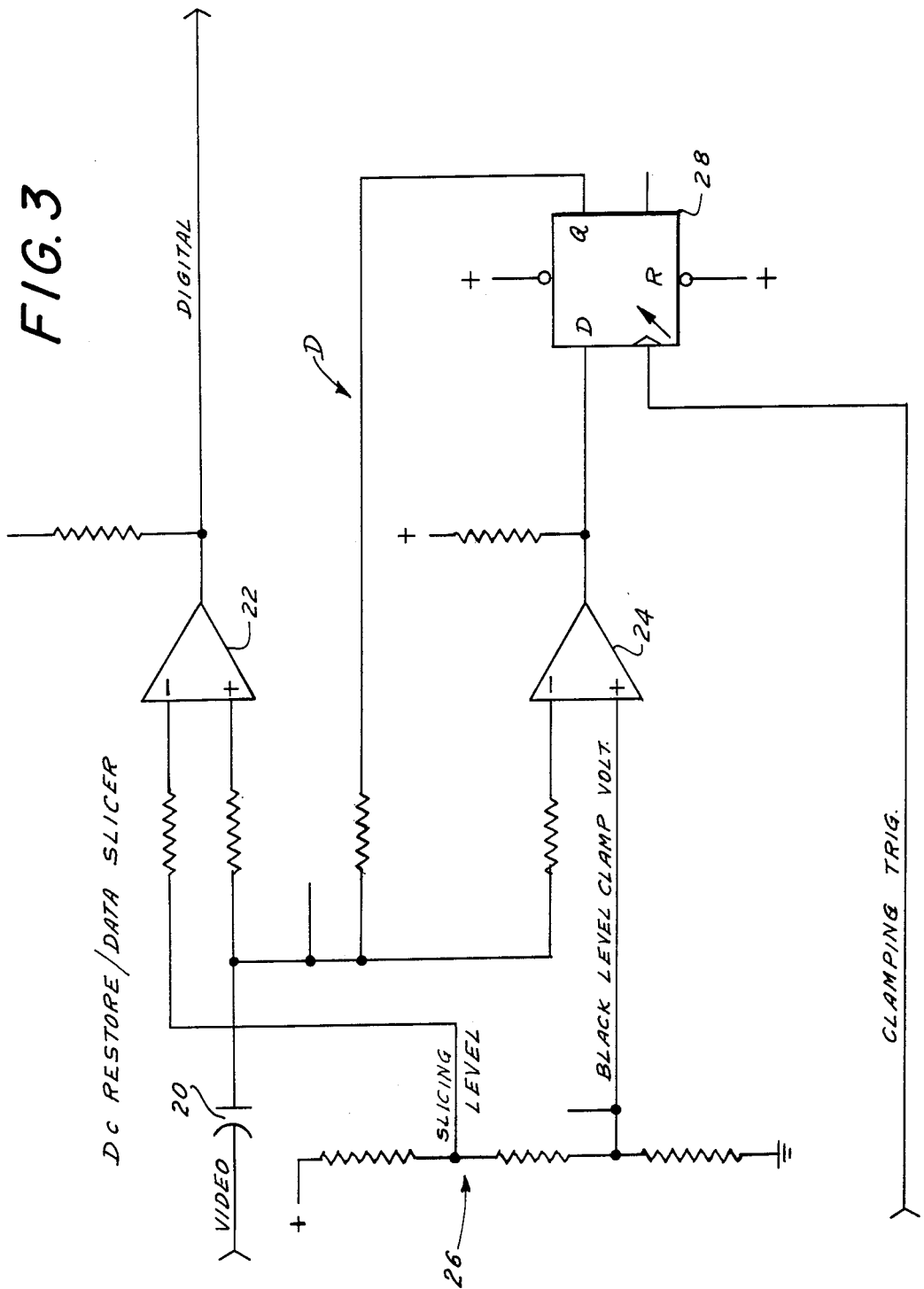
FIG. 3 is a schematic diagram of the video digitizing circuit of the present invention.

The DC restore/data slicer circuit D, shown on FIG. 3, receives the video output from tuner A and the clamping trigger output from synch detect/clamping trigger circuit B. The purpose of circuit D is to provide a sliced digitized data output stream from the unclamped video input. The clamping trigger signal provides a positive transistion during the black reference restoration. The circuit performs the DC restoration function and then slices the data approximately 300 mv above the level of the black, providing for a slicing level of approximately 50% of a 50 IRE signal. The digital output stream is utilized elsewhere in the system to provide the actual data stream from which the encoded data information will be retrieved.

The video input is received at capacitor 20 and fed into the positive input to a first comparator 22 and the negative input of a second comparator 24. A voltage divider, generally designated 26, is situated between a 12 volt source and ground and provides a slicing level voltage input to the negative input of comparator 22. Voltage divider 26 also provides a black level clamp voltage input to the positive input of comparator 24. The output of comparator 24 is connected to the D input of a flip-flop circuit 28, the other input of which receives the clamping trigger output from circuit B. The Q output of flip-flop 28 provides a feed-back input to the comparators.

Circuit D functions to periodically adjust the black level of the video signal by altering the DC level on the positive input of comparator 22 upon the receipt of each of the clamping trigger signals, which, in turn, are a function of the horizontal synchronization signals. Thus, a DC restoration is performed during each horizontal line of the video signal. As will be readily appreciated, the circuit shown in FIG. 3 performs the slicing and stabilization function in a greatly simplified manner as compared to the normal type of sample and hold circuitry which is used in a conventional decoder.

Figure 4:
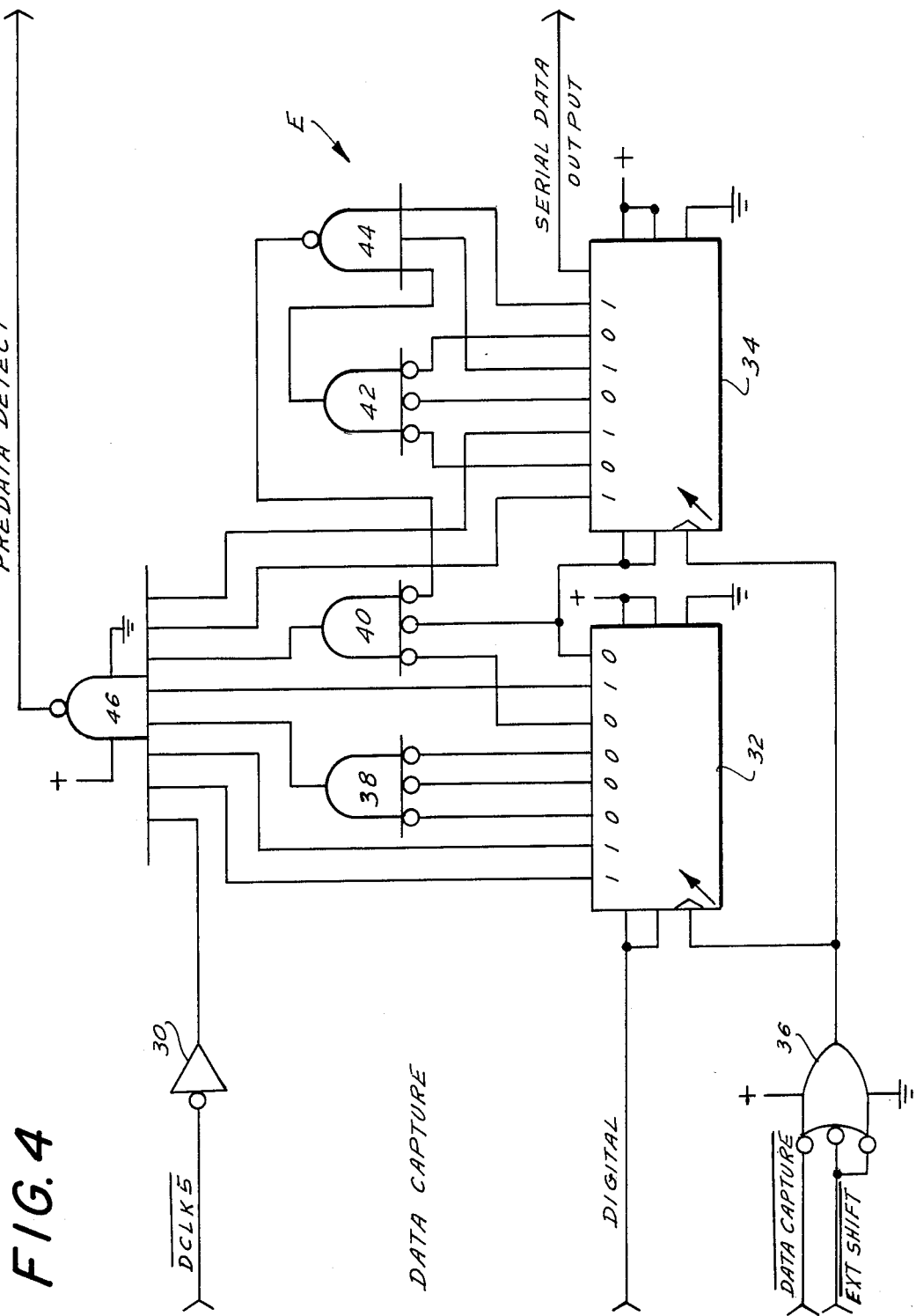
FIG. 4 is a schematic diagram of the data capture circuit of the present invention.

The digitized output signal from circuit D forms one of the inputs to data capture circuit E shown on FIG. 4. Data capture circuit E serves to detect a valid pre-data portion of the composite data signal and, in addition, serves to actually capture the data portion of the composite data signal and retain that data until it is shifted out by the microprocessor section. This circuit receives a clock signal (DCLK5) from the system timing circuit C which is used for synchronization with the data capture signal, also received from system timing circuit C.

The data capture signal actually performs the shifting and acquisition of the data from the digital input. The pre-data detect output feeds back to the system timing circuit C to tell that circuit when a valid preamble has, in fact, been detected. The serial data output is connected to the microprocessor and it is along this output that the captured data is sequentially read bit by bit by the microprocessor. The external shift input is generated by the microprocessor in order to control the acquisition of data from the data capture circuit.

The digitized data from circuit D is applied to the data input of a pair of tandem connected 8-bit shift registers 32, 34. The combined length of registers 32 and 34 is 16 bits, which is the number of bits in the data portion of the standard FCC composite data signal. Shift registers 32 and 34 are indexed simultaneously by the output of a NORgate 36. NORgate 36 receives the complement of the data capture signal and the complement of the external shift signal, as inputs.

The pre-data portion of the composite data signal has a data rate equal to twice the data rate of the data portion, in this case, 1 mHz. After being processed by the data slicer circuit D, the pre-data portion of the standard data composite signal will be a readily recognizable code consisting of 101010101000011. The first nine digits of this code represent the sinewave cycles of the data synchronizing portion of the standard format. The next four digits (all zero) correspond to the 2-bit, 4 microsecond logic "0" which forms the interval prior to the "start" bit. The final two digits of the code (11) correspond to the 1-bit, 2 microsecond logic "1" (start) bit.

One of the unique features of the present invention is that the decoder can recognize the presence of the pre-data portion of the standard composite data signal format, regardless of which of the horizontal lines it appears on. Thus, while conventional decoders are restricted to capturing data only on line 21 of the video signal, the present decoder is capable of capturing data regardless of the line upon which it appears, as long as a valid preamble (pre-data portion) precedes the data portion of the composite data signal.

Conventional decoders are restricted to capturing data only on line 21 of the video signal because they operate by counting the horizontal lines and when line 21 is reached, the data synchronization portion of the composite data signal is used to frequency and phase lock the circuit to receive the data. In the present invention, the data synchronizing portion of the composite data signal is not used for this purpose as the necessity to frequency and phase lock the circuit in order to capture the data has been eliminated. To enable the circuit of the present invention to function to receive a composite data signal in the standard format, the pre-data portion thereof is used as a recognizable preamble to enable the circuit to detect the presence of data.

The pre-data portion of the composite data signal is detected through the use of a network consisting of five gates 38, 40, 42, 44, and 46, which are connected to the various stages of shift registers 32 and 34, as shown on FIG. 4. The clocking signal (DCLK5) complement is inverted in amplifier 30 and connected to one of the inputs of gate 46 such that the operation of gate 46 is synchronized with the indexing of shift registers 32 and 34. When gates 38-46 recognize the appropriate pre-data code in shift registers 32 and 34, a pre-data detect signal will be generated to advise system timing circuit C that the pre-data portion of the data composite signal has been received in the shift registers.

The data capture signal (and DCLK5) normally oscillate at twice the data rate of the data portion of the composite data signal, that is, 1 mHz. As described in detail below, when the pre-data detect signal is received by system timing circuit C, the rate of the data capture signal (and DCLK5) are "downshifted" such that the data capture circuit E operates at half the normal rate, that is, the rate of the data portion of the composite data signal, 5 mHz. Since the data capture signal serves to index shift registers 32 and 34, after the pre-data detect signal is generated, the shift registers will be indexed at the rate of the data portion. This will continue until the data portion of the composite data signal is contained within shift registers 32 and 34. When this occurs, the data capture signal (and DCLK5) will stop oscillating such that the data portion of the composite data signal is stored in the shift registers. The data portion will remain in the shift registers until the external shift signal from the microprocessor causes same to be read out, bit by bit, through the serial data output line.

Figure 5:
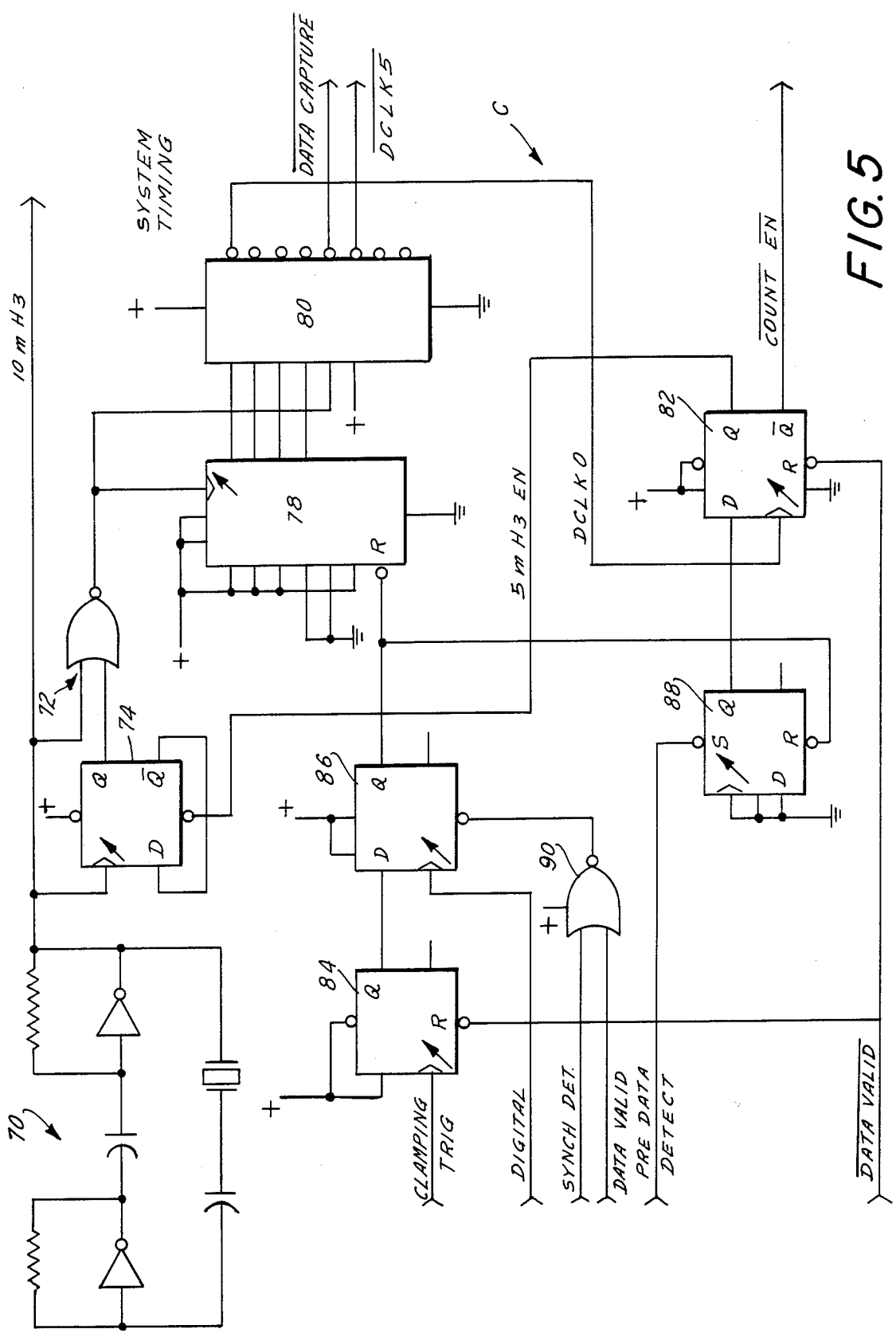
FIG. 5 is a schematic diagram of the system timing circuit of the present invention.

The system timing circuit C, as depicted on FIG. 5, receives the pre-data detect signal from data capture circuit E and uses this signal for two purposes. Upon receipt of the pre-data detect signal, the circuit causes the clocking signals data capture and DCLK5) to oscillate at one-half their normal rate so as to alter the operating rate of the shift registers 32 and 34 to match the rate of the data portion of the composite data signal. How this is accomplished is described in detail below. The receipt of the pre-data detect signal also causes system timing circuit C to generate a count enable signal. The count enable signal output from the system timing circuit C is fed to an input of the data bit counter circuit F, as illustrated on FIG. 6.

The data bit counter circuit serves to count the bits of the data portion as they are captured by shift registers 32 and 34. Aside from the count enable signal, the data bit counter circuit receives the clocking signal DCLK5, a mask signal from video masking circuit G, and the external shift signal from the microprocessor.

The data bit counter circuit consists of a counter 50, such as a divide by 16 circuit, which will generate a signal 16 clock pulses after being reset by the count enable signal. The Q output of counter 50 is connected to the input of a flip-flop circuit 52. When a high-to-low transistion is received from counter 50, flip-flop 52 will change state. The Q output of flip-flop 52 is the data valid signal and this signal, aside from being fed to the microprocessor and to video masking circuit G, forms the input to a flip-flop 54, which, in turn, generates the ready signal to the microprocessor, and the input to a circuit designated 56 which includes a light emitting diode 58 to indicate that data has been captured and is ready to be transferred to the microprocessor. The mask signal from video masking circuit G serves to reset flip-flop 52. The external shift signal from the microprocessor serves to reset flip-flop 54.

The DCLK5 clocking signal input to the data bit counter circuit has no effect during periods when the count enable signal has not been asserted, thereby making the gating of the DCLK5 signal unnecessary. The presence of the mask signal prevents the counter circuit from falsely retriggering. The external shift signal feeds into the data bit counter circuit such that the ready line, once it has been asserted, can be cleared as soon as the microprocessor begins to actually shift data.

The data valid signal and its complement are fed to the system timing circuit C and to video masking circuit G. In system timing circuit C, the data valid signal is utilized to rearm the circuit to stop the clocking signals (data capture and DCLK5) from indexing the shift registers 32 and 34. The complement of the data valid signal is used by the system timing circuit C to reset the flip-flop which generates the count enable signal and which controls the operating rate of the clocking signals, data capture and DCLK5.

The video masking circuit illustrated in FIG. 7 receives the 10 mHz clock signal from the system timing circuit C, as well as the data valid signal and its complement from the data bit counter circuit F. Masking circuit G consists of two flip-clop circuits 60, 62 and a 14 stage ripple carry binary counter/divider circuit which counts one frame between lines containing the composite data signal. This circuit serves to generate a mask signal commencing with the receipt of the data valid signal (indicating that the data portion of the data composite signal has been captured) until approximately one-half a line before the next horizontal line containing the composite data signal, in the next frame. The masking signal is used by the data bit counter circuit F to reset flip-flop 52 which generates the data valid signal and its complement. During the time when the masking signal output is present, the system timing circuit C will prevent shift registers 32 and 34 from being indexed such that no further data can be received in the data capture circuit.

As shown in FIG. 7, flip-flop 60 receives the 10 mHz output from system timing circuit C, as well as the data valid output from data bit counter circuit F. The Q output of flip-flop 60 feeds the input of flip-flop 62, as well as one input of a NANDgate 66. The Q output of flip-flop 62 forms one of the inputs of circuit 64, the other being the complement of the data invalid signal which is also fed to the reset input of flip-flop 62. The outputs of circuit 64 form inputs to gate 66, the output of which is the mask signal.

The mask signal causes the entire system to ignore all further data for one entire frame. This signal will remain in effect until approximately one-half the line preceding the next databurst.

The system timing circuit C, as illustrated in FIG. 5, includes an oscillator, generally designated 70, of conventional design which generates a constant 10 mHz clocking signal to the synch detect/clamping trigger circuit B, to video masking circuit G, and to the microprocessor. The 10 mHz output of oscillator 70 is also fed to a "speed shifting" circuit 72 consisting of a flip-flop 74 and a NORgate 76. The Q output of flip-flop 74 and the output of oscillator 70 form the inputs to NORgate 76. The output of NORgate 76 is fed to a counter circuit 78 (LS 160) and a demultiplexer circuit 80 (LS 138). The purpose of flip-flop 74 and NORgate 76 is to select between an oscillating clock of 10 mHz or 5 mHz. This signal is then fed into counter 78 and demultiplexer 80 which together act as a divide-by-ten circuit to produce up to eight discrete clock signal outputs each with a 5% duty cycle and consecutively spaced 5% apart. Three of these signal outputs, DCLK0, DATA CAPTURE, and DCLK5 are utilized.

Flip-flop 74 is controlled by a signal (5 mHz enable) which is generated by the Q output of a flip-flop 82. The $\overline{Q}$ output of flip-flop 82 is the count enable signal. The reset input R of counter 78 is normally at a low level, thereby holding the counter 78 in reset and causing none of the outputs of the counter 80 device to be active. This is essentially an idling state when no clocking signals are fed to the shift registers 32 and 34. When the clamping trigger signal makes a positive transistion, flip-flop 84 detects this and causes the Q output thereof to go high, thereby causing a flip-flop 86, which has the digitized data signal as one of its inputs, to start looking for a digital signal. Upon a positive transistion of the digital signal at the input of flip-flop 86 (indicating the beginning of a horizontal line signal), the Q output of flip-flop 86 will go high, which coincides with the first positive transistion of the digital signal. When the output of flip-flop 86 goes high, this removes the resets from counter 78 and a flip-flop 88, to which it is also connected. This arms the entire circuit and the data capture and DCLK5 signals oscillate at 10 mHz to permit shift registers 32 and 34 to search the digitized signals.

If the data capture circuit E responds by asserting the pre-data detect signal, this signal is received at the set input of flip-flop 88 and results in flip-flop 88 generating a high signal in its Q output. The Q output of flip-flop 88 is connected to the D input of flip-flop 82 and, on the next DCLKO signal, which is one of the outputs from counter 80, will cause an assertion of the 5 mHz enable signal and the count enable signal. Once this happens, the output of the "speed shifting" circuit changes from 10 mHz to 5 mHz rate. This causes the outputs of the counter 78 and the demultiplexer 80 to down shift to a 5 mHz rate. These outputs include the data capture signal and the DCLK5 signal, which pulse alternately.

As described above, the data capture signal indexes shift registers 32 and 34 and in its "down shifted" mode, will permit 16 bits of data to be clocked into the shift registers at the rate of 0.5 mHz (the rate of the data in the composite data signal). The DCLK5 signal, as explained above, is used for additional clock phasing in the other circuits.

The count enable signal feeds into the data bit counter circuit F and allows the system to continue to cycle through sixteen periods of data acquiring one bit of that data during each of those periods. At the end of that time, the data bit counter F will respond by asserting the data valid signals and the ready output. The data valid signal forms one input to a NORgate 90. The other input to NORgate 90 is the synch detect signal. NORgate 90 is connected to flip-flop 86. Thus, flip-flop 86 is reset at the end of each horizontal line, if no data has been received, or after all of the bits of data have been captured. Resetting flip-flop 86 causes cessation of further clocking of the shift registers. As indicated above, the data valid signal is also utilized by the video masking circuit to activate that circuit, thereby masking all further activities for approximately one frame.

It will now be appreciated that the decoder of the present invention, unlike conventional decoders of this type, is capable of capturing data from any horizontal line in a video signal. In addition, the decoder of the present invention can be utilized to capture data transmitted with the standard FCC composite data signal format. The decoder is capable of recognizing the data synchronizing portion of such a signal and causing shift registers, normally running at twice the data rate of the data portion of the composite data signal, to downshift to the data rate of the data portion of the signal upon detection of the pre-data portion of the signal.

The shift registers perform a dual function in that they both detect the pre-data portion of the signal and capture the data portion. Moreover, slight modifications of the design of the present invention will make the decoder available for capturing data which is sent in other formats, such as where the data portion is at the same rate as the pre-data portion. Further, the decoder of the present invention uses a unique black level signal clamping technique which serves to periodically stabilize the video signal as it is digitized, in a simple and effective manner.

While only a single preferred embodiment of the present invention has been disclosed herein for purposes of illustration, it is obvious that many variations and modifications could be made thereto. It is intended to cover all of these variations and modifications which fall within the scope of the present invention, as defined by the following claims:

We claim:

1. A decoder for decoding data from a video signal of the type including a series of horizontal line segments, one of the lined segments including a data signal in a normally unused part thereof, said apparatus comprising means for digitizing said video signal to form a series of digitized line signals, means for receiving each of said digitized line signals, in sequence, said receiving means comprising shift register means having an input operably connected to receive said digitized line signals, means for clocking said shift register means, means for detecting the presence of a data signal within said receiving means, means for controlling said receiving means to store the data signal in response to the detection thereof, and means for transferring said stored data signal from said receiving means.

2. The decoder of claim 1, wherein each of the horizontal line segments comprises a line synchronization signal, and further comprising means for detecting each of said line synchronization signals and for generating timing signals in response thereto.

3. The decoder of claim 2, wherein said digitizing means comprises means for stabilizing the video signal in response to each of said timing signals.

4. The decoder of claim 3, wherein said digitizing means comprises DC restoration means and slicing means.

5. The decoder of claim 4, wherein said slicing means comprises first comparator means operably connected to receive said video signal and wherein said DC restoration means is operably connected to said first comparator means to adjust the reference level thereof in response to each of said timing signals.

6. The decoder of claim 5, further comprising a slicing level signal source operably connected to said first comparator means.

7. The decoder of claim 5, wherein said DC restoration means comprises second comparator means, a black level clamping signal source operably connected to said second comparator means, gating means, effective when actuated, to operably connect the output of said second comparator means to said first comparator means.

8. The decoder of claim 7, wherein said gating means is actuated by each of said timing signals.

9. The decoder of claim 7, wherein said gating means is effective when actuated by each of said timing signals to connect said output of said second comparator means with an input of said second comparator means.

10. The decoder of claim 1, further comprising means for detecting said digitized line signals and wherein said receiving means is actuated in response to the detection of each of said digitized line signals.

11. The decoder of claim 1, wherein said detecting means comprises gating means operably connected to said shift register means for detecting said data signal and for generating a detection signal in response thereto.

12. The decoder of claim 1, wherein said data signal has a given number of bits and said controlling means comprises counter means operably connected to said clocking means for counting the number of bits of said data signal received in said shift register means, in response to said detection signal, said counting means being effective to terminate said clocking means after said given number of bits are counted.

13. The decoder of claim 12, further comprising means for preventing digitized line signals from being received in said shift register means for a preselected interval after the termination of said clocking means.

14. The decoder of claim 1, wherein said data signal comprises a data portion, and wherein only the data portion of said data signal is stored in said shift register means.

15. The decoder of claim 1, wherein said data signal comprises a pre-data portion and a data portion and wherein said clocking means comprises means for operating said shift register means at the data rate of said pre-data portion until said detection signal is generated and, thereafter, at the data rate of said data portion.

16. The decoder of claim 15, wherein said clocking means comprises an oscillator and means, effective when actuated, to operably connect the output signal from said oscillator to said shift register means.

17. The decoder of claim 16, wherein said connecting means is actuated by the beginning of each digitized line signal and deactuated by the end thereof.

18. The decoder of claim 16, wherein said connecting means comprises means for adjusting the rate of said output signal from said oscillator to correspond with the data rate of the data portion, in resoonse to said detection signal.

19. The decoder of claim 15, wherein said pre-data portion and said data portion have different data rates.

20. A decoder for decoding data from a video signal of the type consisting of a series of horizontal line segments, one of the line segments including a data signal in a section not normally used, the data signal comprising data synchronizing portion at a first data rate and a data portion at a second data rate, said apparatus comprising means for digitizing said video signal to form a series of digitized line signals, means for receiving each of said digitized line signals, in sequence, said receiving means normally operating at the first data rate, means for detecting the presence of the data synchronizing portion within said receiving means, means, effective upon detection of said data synchronizing portion, to control said receiving means to store said data portion, said controlling means comprising means for operating said receiving means at the second data rate, and means for terminating the operation of said receiving means after the data portion is received therein, and means for transferring said stored data from said receiving means.

21. The decoder of claim 20, wherein said receiving means comprises shift register means operably connected to receive said digitized line signals, and further comprising means for clocking said shift register means.

22. The decoder of claim 21, wherein said detecting means comprises gating means associated with said shift register means for detecting the data synchronizing portion in said register means and for generating a detection signal in response thereto.

23. The decoder of claim 22, wherein said data portion comprises a given number of bits and wherein said control means comprises means operably connected to said clocking means for counting the number of bits of the data portion present in said register means, in response to the generation of said detection signal, and thereafter to deactuate said clocking means when all of the bits in the data portion have been received in said shift register means.

24. The decoder of claim 23, further comprising means for preventing digitized line signals from being received in said register means for a preselected interval after all of the bits in the data portion have been received in the shift register means.

25. The decoder of claim 21, wherein only the data portion of said digitized line signal is retained in said register means.

26. The decoder of claim 22, wherein said clocking means comprises means for operating said register means at the first data rate until said detection signal is generated and, thereafter, at the second data rate.

27. The decoder of claim 21, wherein said clocking means comprises an oscillator and means, effective when actuated, for operably connecting said oscillator to said register means.

28. The decoder of claim 27, wherein said connecting means is actuated by the beginning of each digitized line signal and deactuated by the end thereof.

29. The decoder of claim 27, wherein said connecting means comprises means for adjusting the rate of the output signal from said oscillator to the second data rate.

30. The decoder of claim 20, wherein the first data rate is different than the second data rate.

31. The decoder of claim 20, wherein said first data rate is 10 mHz.

32. The decoder of claim 20, wherein said second data rate is 5 mHz.

33. Apparatus for slicing and stabilizing a video signal, said apparatus comprising slicing level source means, DC level source means, first comparator means having first and second inputs, said first input of said first comparator means being operably connected to receive said video signal, said second input of said first comparator means being operably connected to said slicing level source and means for operably connecting said DC level source to said first input of said first comparator means to periodically adjust the DC level of said video signal.

34. The apparatus of claim 33, wherein said video signal comprises a plurality of line synchronization signals and further comprising means for detecting said line synchronization signals, and wherein said connecting means is effective, in response to the detection of said line synchronization signals, to operably connect said DC level source to said first input of said first comparator means.

35. The apparatus of claim 34, wherein said connecting means comprises second comparator means having first and second inputs and an output, said first input of said second comparator means being operably connected to said DC level source and said second input of said second comparator means being operably connected to receive said video signal.

36. The apparatus of claim 35, further comprising gating means, effective when actuated to connect said output of said second comparator means to said first input of said first comparator means and said second input of said second comparator means.

37. The apparatus of claim 36, wherein said gating means is actuated in response to the detection of each of said line synchronizing signals.

* * * * *